United States Patent Office 3,078,142
Patented Feb. 19, 1963

3,078,142
PROCESS FOR SEPARATING YTTRIUM
AND RARE EARTHS
Kazimierz Jozef Bril, Rua 4 89 Jardim Elvira Santo
Amaro, and Pawel Krumholz, Rua Maestro Elias
Lobo 241, both of Sao Paulo, Brazil
No Drawing. Filed Aug. 19, 1958, Ser. No. 755,894
Claims priority, application Brazil Sept. 2, 1957
4 Claims. (Cl. 23—22)

A great number of methods have been proposed for the separation of yttrium and the elements of the rare earths group. Of all the problems occurring in such separation, the separation of yttrium, dysprosium, terbium and gadolinium seems to present the greatest difficulties.

It is the object of this invention, to provide a simple, practical and highly efficient process for separating yttrium from the rare earths, particularly the terbium earths, based on the fractional precipitation of postassium and/or ammonium double chromates.

The fractional precipitation of yttrium and rare earths by means of alkali chromates was proposed a long time ago for separation of those elements. This method has been used, for instance, in such manner that a boiling, dilute solution of bichromates of rare earths and yttrium was precipitated by means of an alkali chromate. The process is rather cumbersome and due to the difficulty of achieving an economical recovery of the large amount of chromic acid used, hardly suitable for large scale separations. Furthermore, the separational efficiency of this process seems to be only moderate.

More recently it has been proposed to precipitate a boiling solution of rare earths and yttrium nitrates, containing potassium bichromate, by the stepwise addition of caustic soda. It has been stated that the first fractions consist of normal and of double chromates and are enriched in the middle earths. Further addition of the alkali precipitates basic chromates, rich in the heavy earths. Yttrium is enriched in the final fractions. It has further been stated that this particular method has the advantage of separating yttrium in one operation from both the middle and the heavy rare earths. Actually both separations are poor. The separation from gadolinium is less efficient than that obtained by means of double sulfates. Similarly, the heavy earths are separated less efficiently than by means of an ammonia fractionation. The separation of yttrium and dysprosium is moderate. For instance, a mixture containing about 60% yttrium oxide, 20% gadolinium oxide and 16% dysprosium oxide, yields about 25% of the original yttrium content with more than 1% of dysprosium, and only 3% which still contains 0.4% of that element.

From what has been known about the chromate process in its different forms of execution, it could not have possibly been foreseen that this process could be turned into the most efficient one for the separation of yttrium from the terbium earths. It was especially impossible to foresee that yttrium might be obtained with a higher yield than previously obtained in fractional precipitations while being practically free of the other elements.

The failure of earlier attempts to achieve a satisfactory separation of yttrium from rare earths by means of the chromate process is mainly due to the following reason: It was never realized that the chromate process, while representing an efficient means for separating yttrium from the terbium earths, has only a moderate efficiency in the separation of yttrium from the heaviest earths. The effort to separate yttrium in one operation from both, terbium and heavy earths has led to a compromise resulting in both separations being far from satisfactory.

Having recognised the potentiality of the chromate process, as an efficient means for separating yttrium from the terbium earths, we established the operating conditions for an efficient separation of those elements, conditions which are the object of this invention.

We found, first of all, what was previously unknown, that only the precipitation of double alkali-rare earths chromates but not that of normal chromates, presents an efficient means of separating yttrium from the terbium earths, and that only potassium and further ammonium but not sodium form such double chromates.

We found, furthermore, that not only the separation of yttrium from gadolinium but also that of yttrium from dysprosium and even from holmium is unfavourably influenced by the formation of basic chromates.

Finally, we found that the presence of nitrates has an unfavourable influence on the efficiency of the chromate process in general. The separation of yttrium from the rare earths is, contrary to what could have been expected from earlier observations, more efficient in chloride than in nitrate solutions.

It is the object of this invention to describe an improved process for an efficient, simple and economic separation of yttrium from the rare earths, particularly the terbium earths, which consists in the fractional precipation of potassium and/or ammonium double chromates of rare earths and/or yttrium, and which is consistent with our new findings. It is a particular object of this invention to specify the conditions wherein the formation of normal and basic chromates is avoided as much as possible. It is a further object of this invention to specify all other working conditions which favour the separation of yttrium from the rare earths, particularly the terbium earths.

Whereas this invention is based on new scientific knowledge, the validity on our claims is independent of any scientific explanation and is based essentially on the practical efficiency of our process.

In one embodiment of this invention, a solution of rare earths end yttrium salts, containing bichromate ions in a quantity sufficient to maintain an excess of at least 0.02 mol per liter is partially precipitated by addition of an aqueous solution of potassium hydroxide or of ammonium hydroxide, purified yttrium being recovered from the final solution.

It is another object of this invention to perform the precipitation with gaseous ammonia, pure or diluted with an inert gas.

It is still another object of this invention to perform the precipitation with a solution of potassium or ammonium carbonate or bicarbonate.

It is a further object of this invention to perform the precipitation with a solution of potassium or ammonium chromate.

The efficiency of the fractionation may be increased, and it is another object of this invention to do so, by adding potassium and/or ammonium chloride to the original solution.

The fractionation is most efficient, if the original solution is free of nitrates. However, satisfactory separations are still possible, if the solution contains not more than 3 mols of nitrate per liter.

In another embodiment of this invention, a solution of rare earths and yttrium salts, containing bichromate and potassium and/or ammonium ions in a quantity sufficient to maintain an excess of at least 0.2 mol of bichromate and of at least 0.2 mol of potassium and/or ammonium ions per liter, and originally not more than 1 mol of nitrate per liter, is partially precipitated with a solution of sodium hydroxide, carbonate, bicarbonate or chromate, purified yttrium being recovered from the final solution.

Since high dilution favours the formation of basic salts, fractionations are best performed at high concentrations, preferably at a concentration of 100 to 200 g. of total rare earths and yttrium oxides per liter. Fractionation is interrupted if the final concentration drops below 15 g. of total oxides per liter.

The temperature has no pronounced effect on the efficiency of the fractionation. It does, however, influence the crystalline behaviour and the filtrability of the precipitated double chromates. Fractionation is preferably performed at temperatures between 45° C. and 85° C.

We further found that stepwise precipitation of several smaller fractions, instead of a single precipitation, increases the efficiency of the fractionation process. It was found especially important that the fraction preceding the final yttrium fraction contain less than 25% of the original total oxide content.

We found, furthermore, that excessive washing of the precipitated double chromates contaminates, due to their nonselective solubility, the subsequent fractions. It is another object of this invention to wash the precipitated double chromates with not more than twice their volume of water, or preferably of a solution of potassium chloride.

Starting with a material containing 70 to 80% of yttrium oxide and as balance the oxides of the heavy and middle earths and some cerium earths, it is possible to obtain, by using our improved process, in the final solution in one single operation between 30 and 35% of the original yttrium content containing between 0.05 and 0.2% of dysprosium plus gadolinium oxide. Cerium earths are removed at least as efficiently as the terbium earths. It is a further advantage of our process that holmium, and even the heaviest earths, are reduced in the final solution by a factor of 3 to 10. Using materials higher in yttrium, or by decreasing somewhat the yield of the final yttrium fraction, it is possible to obtain a material containing at most 0.02% of terbium plus cerium earths. There does not seem to exist any other chemical method for separating yttrium and rare earths which, in a single operation has a similar efficiency.

In order to obtain reasonable yields of yttrium, the double chromate fractions must be refractionated.

According to this invention the double chromates are dissolved in the minimum necessary amount of mineral acid, preferably hydrochloric acid, and the resulting solution submitted to a new precipitation of double chromates by one of the methods described previously.

Alternatively, such solutions are mixed with solutions of the original material and this mixture submitted to a new fractionation process.

If the material submitted to the fractionation process contains less than about 60% of yttrium oxide the yield of highly purified yttrium in the final solution will be low, due to lowering of the efficiency of the fractionation at the high final dilutions. It is another embodiment of this invention, to interrupt the fractionation at an earlier stage and to recycle the final solution into the fractionation process by mixing it with concentrated solutions of a material of similar composition or by using it in the dissolution of such a material.

Alternatively the yttrium content of the material submitted to the fractionation process is increased by addition of double chromate fractions higher in yttrium than the original material.

By refractionating and recycling the double chromate fractions in the manner specified above it is possible to recover in a few operations about 90% of the original yttrium content of a material containing between 70% and 80% of yttrium oxide with practically any degree of decontamination from the terbium and cerium earths.

EXAMPLE I 130 g. of an oxide mixture of the composition indicated in Table I were dissolved in hydrochloric acid and diluted to a volume of 1 liter. The solution was heated to 75° C. and 185 g. of potassium bichromate dissolved in the solution. 238 ml. of 2 M potassium hydroxide were added slowly to the well agitated solution. The precipitated double chromates were filtered and washed with a 2% solution of potassium chloride. The combined filtrate and wash water were heated to 75° C., 75 g. of potassium bichromate were added, and precipitated with 317 ml. of 2 M potassium hydroxide. The precipitate was filtered, washed with 150 ml. of a 2% solution of potassium chloride and a third fraction precipitated from the filtrate at 75° C., using 163 ml. of 2 M potassium hydroxide. The filtrate from this third fraction was precipitated with sodium carbonate. The results of the fractionation are shown in Table I below.

Table I

| Percent precipitated | $Nd_2O_3$ | $Gd_2O_3$ | $Dy_2O_3$ | $Ho_2O_3$ | $Er_2O_3$ | $Tm_2O_3$ | $Y_2O_3$ |
|---|---|---|---|---|---|---|---|
| 25.1 | 0.4 | 8 | 27 | 2.2 | 4.6 | 0.4 | |
| 34 | 0.1 | 3 | 16.5 | 2.4 | 5.3 | 0.5 | |
| 15.4 | | 0.5 | 3.3 | 1.2 | 4.0 | 0.4 | |
| 25.9 | | <0.05 | 0.18 | 0.23 | 1.25 | 0.2 | |
| 100 | 0.14 | 3.2 | 13.0 | 1.8 | 3.8 | 0.4 | 76% |

EXAMPLE II 131 g. of an oxide mixture of the composition indicated in Table II, were dissolved in hydrochloric acid and diluted to 1 liter. 184 g. of potassium bichromate and 100 g. of potassium chloride were dissolved in the solution, heated to 75° C. and the solution precipitated by slow addition of 229 ml. of 2.09 M sodium hydroxide. The precipitate was filtered and washed with 70 ml. water. 76 g. of potassium bichromate were added to the filtrate and a second fraction was precipitated at 65° C. using 288 ml. of 2.09 M sodium hydroxide. The precipitate was filtered and a third fraction precipitated at 55° C. by addition of 190 ml. of 2.09 M sodium hydroxide. The filtrate from this third fraction was precipitated with sodium carbonate. The corresponding data are shown in Table II below.

Table II

| Percent precipitated | $Nd_2O_3$ | $Gd_2O_3$ | $Dy_2O_3$ | $Ho_2O_3$ | $Er_2O_3$ | $Y_2O_3$ |
|---|---|---|---|---|---|---|
| 27.4 | 0.5 | 8 | 27.4 | 2.3 | 4.9 | |
| 30.0 | 0.1 | 3 | 16.1 | 2.4 | 5.2 | |
| 18.3 | | 0.5 | 3.6 | 1.2 | 3.9 | |
| 24.3 | | <0.05 | 0.18 | 0.25 | 1.3 | |
| 100 | 0.17 | 3.2 | 13 | 1.75 | 4.0 | 76% |

EXAMPLE III 165 g. of the oxide mixture of the composition indicated in Table III were dissolved in hydrochloric acid and diluted to a volume of 1 liter. 20 g. of potassium bichromate were dissolved in the solution, heated to 70° C. and the solution precipitated by addition of 460 ml. of a 1.35 M solution of potassium chromate. The precipitate was filtered and two more fractions precipitated using 510 and 412 ml. respectively of the chromate solution. The corresponding data are shown in Table III below.

Table III

| Percent precipitated | $Nd_2O_3$ | $Gd_2O_3$ | $Dy_2O_3$ | $Ho_2O_3$ | $Er_2O_3$ | $Y_2O_3$ |
|---|---|---|---|---|---|---|
| 25.3 | 0.3 | 5 | 27 | 3.7 | 5.8 | |
| 28.8 | 0.1 | 2 | 13 | 3.3 | 6.6 | |
| 20.6 | | 0.1 | 1.9 | 1.3 | 4.0 | |
| 25.3 | | | | 0.1 | 0.2 | 1.05 | |
| 100 | 0.1 | 1.8 | 11 | 2.2 | 4.5 | 79% |

EXAMPLE IV 4,900 g. of an oxide mixture of a composition indicated in Table IV were dissolved in hydrochloric acid and diluted to a volume of 30 liters. 7,000 g. of potassium bichromate were dissolved in the solution, heated to 65° C. and a first fraction of double chromates precipitated by passing a mixture of gaseous ammonia with ten times its volume of air, totaling 328 g. of $NH_3$, during 1 hour through the solution. The precipitate was filtered and washed with 3 liters of a 2% potassium chloride solution. A second fraction was precipitated from the filtrate under similar conditions, using 368 g. of $NH_3$. To the filtrate from this fraction was added 4,650 g. of potassium bichromate and a third fraction precipitated using 282 g. of $NH_3$. The final filtrate was precipitated with ammonium carbonate. The corresponding data are shown in Table IV below.

Table IV

| Percent precipitated | $Nd_2O_3$ | $Gd_2O_3$ | $Dy_2O_3$ | $Ho_2O_3$ | $Er_2O_3$ | $Y_2O_3$ |
|---|---|---|---|---|---|---|
| I, 27.4 | 0.35 | 11 | 24.5 | 3.45 | 5.2 | |
| II, 29.0 | 0.05 | 5 | 14 | 3.1 | 5.6 | |
| III, 20.1 | | 0.5 | 2 | 1.25 | 3.6 | |
| IV, 23.5 | | <0.025 | 0.06 | 0.18 | 1.0 | |
| 100 | 0.11 | 4.5 | 11.2 | 2.15 | 4.0 | 78% |

EXAMPLE V

The first double chromate fraction of Example IV, totaling 1,340 g. of rare earths plus yttrium oxides, was suspended in 8 liters of water, heated to 65° C. and dissolved by the addition of hydrochloric acid. 1,950 ml. of 2 M potassium hydroxide were added slowly to the agitated solution and the precipitated double chromates separated by filtration. A second fraction was precipitated by adding 3,200 ml. of 2 M potassium hydroxide. The corresponding data are shown in Table V below.

Table V

| Percent precipitated | $Nd_2O_3$ | $Gd_2O_3$ | $Dy_2O_3$ | $Ho_2O_3$ | $Er_2O_3$ | $Y_2O_3$ |
|---|---|---|---|---|---|---|
| I, 22.4 | 1.0 | 23 | 38 | 4.0 | 4.8 | 26% |
| II, 36.5 | 0.3 | 15 | 32 | 4.5 | 6.0 | 40% |
| III, 41.1 | | <1 | 9 | 2.2 | 5 | 82% |
| 100 | 0.35 | 11 | 24.5 | 3.45 | 5.2 | 54% |

EXAMPLE VI

The second and third fractions of Example IV, totaling 2,400 g. of rare earths plus yttrium oxides, were suspended in the filtrate from the second fraction of Example V, containing 550 g. oxides, heated to 60° C. and dissolved by the addition of hydrochloric acid. The solution was mixed with a solution of 1,950 g. of the original oxide mixture, used in Example IV, dissolved in hydrochloric acid and brought to a total volume of 30 liters. A first fraction of double chromates was precipitated at 65° C. by passing 320 g. of gaseous ammonia, mixed with ten times its volume of air, through the solution. 3,000 g. of potassium bichromate were dissolved in the filtrate and two further fractions precipitated, using 370 and 250 g. of ammonia respectively. The corresponding results are shown in Table VI below.

Table VI

| Percent precipitated | $Nd_2O_3$ | $Gd_2O_3$ | $Dy_2O_3$ | $Ho_2O_3$ | $Er_2O_3$ | $Y_2O_3$ |
|---|---|---|---|---|---|---|
| 27.0 | 0.2 | 9 | 21 | 3.6 | 6 | |
| 29.0 | 0.03 | 3.5 | 10 | 3.1 | 6.5 | |
| 17.6 | | <0.5 | 1.5 | 1.2 | 4.0 | |
| 26.4 | | | 0.08 | 0.2 | 1.2 | |
| 100 | 0.06 | 3.5 | 9 | 2.3 | 4.5 | 80% |

What is claimed is:

1. In a method of separating yttrium from rare earths of the terbium group, the steps of adding to an aqueous solution selected from the group consisting of a mixture of yttrium and rare earth chlorides, and a mixture of yttrium and rare earth chlorides with not more than 3 moles per liter of nitrates, said solution containing a total of yttrium and rare earths calculated as their oxides equivalent to 100–200 g./l. and also containing in solution free bichromate ions from a soluble bichromate selected from the group consisting of potassium bichromate and ammonium bichromate, in an amount sufficient to maintain an excess of at least 0.02 mole per liter, an alkaline precipitating agent selected from the group consisting of potassium chromate, potassium hydroxide, potassium carbonate, potassium bicarbonate, ammonium chromate, ammonium hydroxide, ammonia, ammonium carbonate and ammonium bicarbonate at a temperature of 45–85° C. so as to fractionally precipitate the corresponding insoluble double alkaline chromates of said yttrium and rare earths; continuing said addition until the concentration of remaining solution falls below 15 g./l. of yttrium and rare earths calculated as their oxides and interrupting said addition at such time; recovering said insoluble double alkaline chromates of said yttrium and rare earths; and recovering a purified yttrium product from the remaining solution.

2. In a method of separating yttrium from rare earths of the terbium group, the steps of adding to an aqueous solution of a mixture of yttrium and rare earth chlorides being substantially free of nitrates containing a total of yttrium and rare earths calculated as their oxides equivalent to 100–200 g./l. and also containing in solution free bichromate ions from a soluble bichromate selected from the group consisting of potassium bichromate and ammonium bichromate, in an amount sufficient to maintain an excess of at least 0.02 mole per liter, an alkaline precipitating agent selected from the group consisting of potassium chromate, potassium hydroxide, potassium carbonate, potassium bicarbonate, ammonium chromate, ammonium hydroxide, ammonia, ammonium carbonate and ammonium bicarbonate at a temperature of 45–85° C., and also adding a chloride selected from the group consisting of potassium chloride and ammonium chloride to said solution so as to fractionally precipitate the corresponding insoluble double alkaline chromates of said yttrium and rare earths; continuing said addition until the concentration of remaining solution falls below 15 g./l. of yttrium and rare earths calculated as their oxides and interrupting said addition at such time; recovering said insoluble double alkaline chromates of said yttrium and rare earths; and recovering a purified yttrium product from the remaining solution.

3. In a method of separating yttrium from rare earths of the terbium group, the steps of adding to an aqueous solution of a mixture of yttrium and rare earth chlorides being substantially free of nitrates containing a total of yttrium and rare earths calculated as their oxides equivalent to 100–200 g./l. and also containing in solution free bichromate ions from a soluble bichromate selected from the group consisting of potassium bichromate and ammonium bichromate, in an amount sufficient to maintain an excess of at least 0.02 mole per liter, a gaseous mixture of ammonia and a gas inert to the reactants at a temperature of 45–85° C. so as to fractionally precipitate the corresponding insoluble double ammonium chromate of said yttrium and rare earths; continuing said addition until the concentration of remaining solution falls below 15 g./l. of yttrium rare earths calculated as their oxides and interrupting said addition at such time; and recovering said insoluble double ammonium chromates of said yttrium and rare earths; and recovering a purified yttrium product from the remaining solution.

4. In a method of separating yttrium from rare earths of the terbium group, the steps of adding to an aqueous solution of a mixture of yttrium and rare earth chlorides being substantially free of nitrates, containing a total of yttrium and rare earths calculated as their oxides equivalent to 100–200 g./l. and also containing in solution free bichromate ions from a soluble bichromate selected from the group consisting of potassium bichromate and ammonium bichromate, in an amount sufficient to maintain an excess of at least 0.02 mole per liter, an alkaline precipitating agent selected from the group consisting of potassium chromate, potassium hydroxide, potassium carbonate, potassium bicarbonate, ammonium chromate, ammonium hydroxide, ammonia, ammonium carbonate and ammonium bicarbonate at a temperature of 45–85° C., and also adding a soluble bichromate selected from the group consisting of potassium bichromate and ammonium bichromate in an amount sufficient to maintain the concentration of free bichromate ions in said solution at at least 0.02 mol/l. so as to fractionally precipitate the corresponding insoluble double alkaline chromates of said yttrium and rare earths; continuing said addition until the remaining solution contains a maximum of 15 g./l. of yttrium and rare earths calculated as their oxides and interrupting said addition at such time; dissolving the thus obtained insoluble double alkaline chromates of said yttrium and rare earths in hydrochloric acid; mixing the thus obtained solution with the initial aqueous solution of yttrium and rare earth chlorides so as to obtain a combined solution; adjusting the concentration of yttrium and rare earth chlorides in said combined solution to a total of yttrium and rare earths calculated as their oxides equivalent to 100–200 g./l.; repeating said addition of said alkaline precipitating agent as above described to fractionally precipitate said insoluble double alkaline chromates of said yttrium and rare earths; and recovering a purified yttrium product from the remaining solution.

References Cited in the file of this patent

FOREIGN PATENTS

| | | |
|---|---|---|
| 374,540 | France | Apr. 20, 1907 |
| 892,536 | France | Jan. 10, 1944 |
| 433,454 | Germany | Sept. 4, 1926 |

OTHER REFERENCES

"Encyclopedia of Chemical Technology," vol. 11, The Interscience Encyclopedia Inc., N.Y., 1953, pages 503–504.

Hall: Article in "Journ. Chem. Soc." (London), 1955, Part III, pages 2409–2412.